A. C. BADGER.
EXPANSION JOINT.
APPLICATION FILED JAN. 4, 1912.
1,052,709.
Patented Feb. 11, 1913.
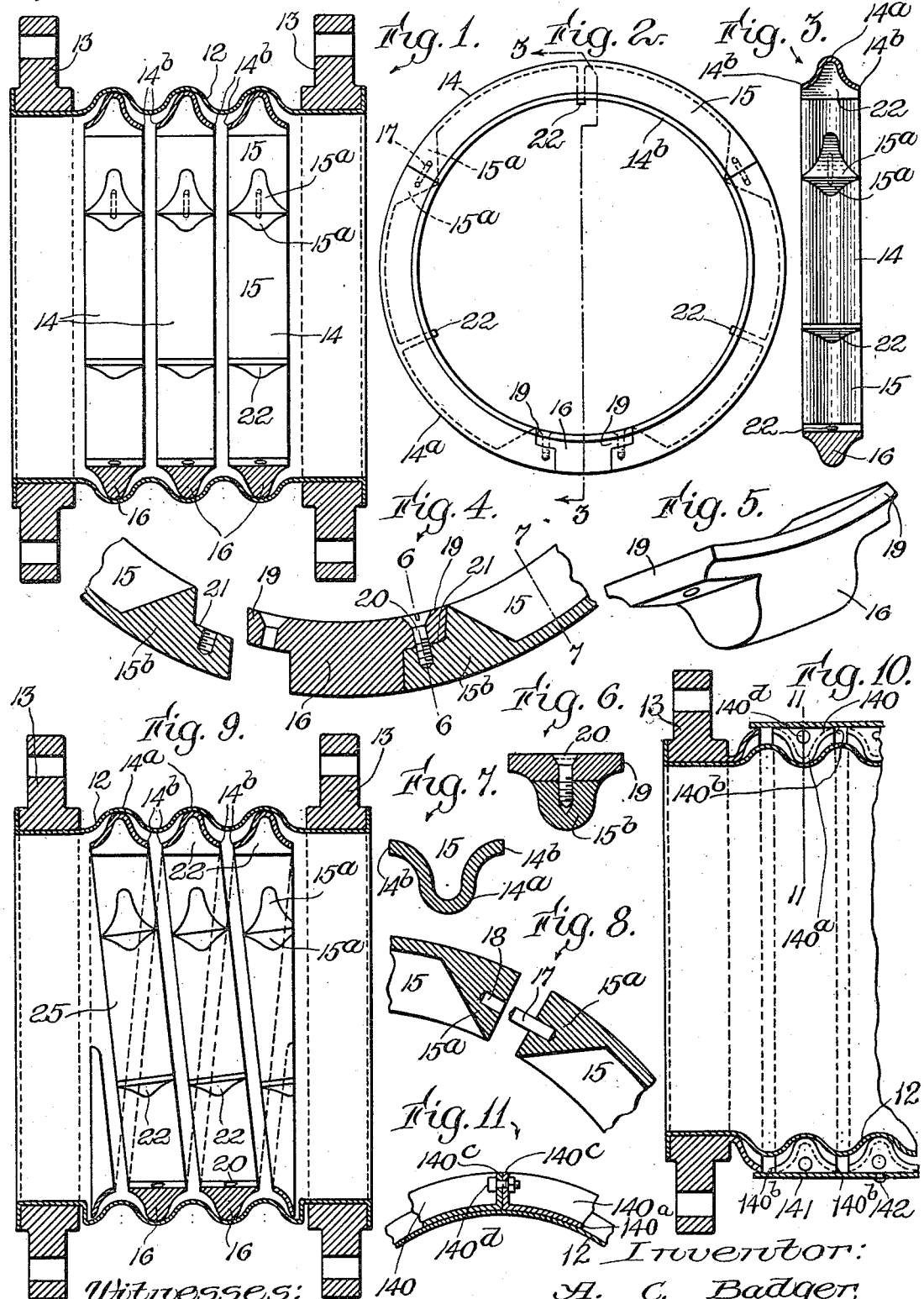

UNITED STATES PATENT OFFICE.

ARTHUR C. BADGER, OF NEWTON, MASSACHUSETTS.

EXPANSION-JOINT.

1,052,709.
Specification of Letters Patent. Patented Feb. 11, 1913.

Continuation of application Serial No. 626,565, filed May 11, 1911. This application filed January 4, 1912. Serial No. 669,359.

*To all whom it may concern:*

Be it known that I, ARTHUR C. BADGER, a citizen of the United States, and a resident of Newton, in the county of Middlesex and State of Massachusetts, have invented certain new and useful Improvements in Expansion-Joints, of which the following is a specification.

This invention relates to tubular joints or sections employed for coupling together lengths of rigid tubing forming elongated pipe lines, the joints being longitudinally compressible and expansible to compensate for expansion and contraction of the rigid pipe sections.

The invention has for its object to provide a simple, durable and effective expansion joint construction adapted to meet the usual requirements of an expansible joint and to prevent the possibility of excessive and injurious contraction of the same.

The invention consists in the improvements which I will now proceed to describe and claim.

Of the accompanying drawings which form a part of this specification:—Figure 1 represents a longitudinal section of an expansion joint embodying my invention; Fig. 2 represents a side view of one of the internal rings shown by Fig. 1; Fig. 3 represents a section on line 3—3 of Fig. 2; Fig. 4 represents an enlarged sectional view of a portion of the ring shown by Figs. 2 and 3, two of the ring segments being separated from each other; Fig. 5 represents a perspective view of the shorter segment or key piece, shown by Fig. 4; Fig. 6 represents a section on line 6—6 of Fig. 4; Fig. 7 represents a section on line 7—7 of Fig. 4; Fig. 8 represents a sectional view showing the end portions of two of the longer segments; Fig. 9 represents a view similar to Fig. 1, showing a modification; Fig. 10 represents a view similar to a portion of Fig. 1, showing another modification; Fig. 11 represents a section on line 11—11 of Fig. 10.

Similar reference characters indicate the same parts in all the figures.

In Figs. 1 to 8 of the drawings,—12 represents a continuous sheet metal tube provided with peripheral corrugations between its end portions, said corrugations permitting the longitudinal contraction and expansion of the tube in a manner well understood in expansion joints. The end portions of the tube 12 are secured to suitable rigid rings or flanges 13 adapted to be bolted to the flanges on the ends of the rigid pipe sections forming parts of a pipe line, the tube constituting a fluid tight conduit.

Within the tube 12 are located a series of independent practically rigid rings 14 which reinforce the tube, and are adapted to limit its longitudinal contraction, and thus prevent injury to the corrugations thereof. Each ring has a peripheral ridge 14$^a$ which projects between two adjacent corrugations of the tube 12, and laterally projecting edge portions 14$^b$, of smaller diameter, within the said ridge, the edge portions of the adjacent rings being normally separated from each other, as shown by Fig. 1, and adapted to meet or abut against each other within the tube when the latter is contracted to the maximum extent desired, and thus prevent further and injurious contraction of the tube.

Each ring is composed of a plurality of separable segments which are adapted to be assembled within the tube to form a complete ring, and are provided with means whereby their meeting ends are detachably connected. As here shown, the ring is composed of three elongated segments 15 which collectively constitute the greater portion of the ring, and a shorter segment 16 which bridges the space between two of the elongated segments 15, and constitutes what I term a key piece. The meeting ends of the segments 15 are provided with dowel pins 17 and sockets 18 (Fig. 8) which couple said meeting ends together and permit them to be readily separated from each other. The key piece 16 is provided at its ends with ears 19 having holes for the reception of attaching screws 20 which detachably and positively secure the key piece to the ends of the adjacent elongated segments 15, said elongated segments having recesses 21 which receive the ears 19.

In applying the rings to the tube, the elongated segments are first coupled together end to end by inserting the dowels 17 in the sockets 18, the key piece 16 being then applied and secured to the adjacent elongated segments by the screws 20. The elongated segments 15 are preferably channeled to reduce their weight to the minimum, each segment having an arched form in cross section, as shown by Fig. 7, excepting at their ends which are preferably closed by heads 15a and 15b, as shown by Figs 4 and 8, to afford means for supporting the dowels 17, and for containing the sockets 18 and the recesses 21. The arched portions of the elongated segments are preferably provided with transverse bridges or braces 22.

Instead of forming independent corrugations on the tube 12 and providing independent rings 14, as above described, I may provide the tube with a continuous helical corrugation, the convolutions of which are arranged like those of a screw thread, as shown by Fig. 9. In this modification, an equivalent of the independent rings 14 is provided by the convolutions of a continuous helical contraction-limiting member 25. Said convolutions are formed to enter the helical convolutions of the tube and their edges are normally separated from each other and adapted to be brought together within the tube to limit the contraction of the latter. The member 25 may be composed of segments adapted to be assembled and connected within the tube to form a continuous helix instead of forming independent rings.

In each of the embodiments of my invention shown and described, a skeleton internal reinforcing structure is provided which permits the free elongation of the tube, and limits its contraction, said structure having opposed edges 14b which are separated when the tube is expanded or elongated, and are abutted together by the contraction of the tube, and intermediate portions 14a on which said edges are formed, said intermediate portions constituting a rigid non-compressible lining when the edges are abutted together. The form of said structure is such that it does not obstruct the conduit passage through the tube. The reinforcing structure is also flexible and does not interfere with the flexibility of the corrugated tube, so that the latter may be connected with rigid pipe sections more or less out of alinement with each other.

Figs. 10 and 11 show an embodiment of my invention in which the reinforcing structure is on the exterior of the tube and is composed of a series of rings 140, each having an inwardly projecting ridge 140a which bears on the external surface of the tube 12 between two adjacent corrugations, and laterally projecting edge portions 140b of larger diameter, which are normally separated from each other and are adapted to meet outside the corrugations of the tube when the latter is contracted to the maximum extent desired.

Each ring 140 is composed of a plurality of separable segments adapted to be assembled end to end upon the tube to form a complete ring, the meeting ends of the segments being provided with flanges 140c detachably connected by bolts 140d, as shown by Fig. 11. The end rings of the structure may be formed to abut against the end rings or flanges 13 when the tube is contracted to the maximum extent desired.

141 represents a casing which may be a sheet metal tube riveted at 142 to one of the rings 140, and free to slip on the other rings. The casing is formed to cover the spaces between the rings 140 and exclude dirt, etc., therefrom.

I claim:—

1. An expansion joint comprising a continuous flexible metal tube peripherally corrugated to permit longitudinal expansion and contraction, and an independent reinforcing structure having ridges bearing on the tube between the corrugations thereof, and laterally projecting edge portions adapted to be separated by the elongation of the tube and to be brought together by the contraction of the tube to positively limit such contraction and prevent injury to the tube thereby.

2. An expansion joint comprising a peripherally corrugated tube, and independent rings having central portions bearing on the tube between the corrugations thereof and laterally projecting edge portions adapted to meet to limit the contraction of the tube, said rings being composed of segments adapted to be assembled end to end and provided with means for detachably connecting their meeting ends.

3. An expansion joint comprising a continuous flexible tube peripherally corrugated to permit longitudinal expansion and contraction, and independent rings having peripheral ridges bearing on the interior of the tube between the corrugations thereof, and laterally projecting edge portions of smaller diameter than said ridges and adapted to be separated by the elongation of the tube and to be brought together within the tube by the contraction of the latter to limit such contraction, the rings constituting a flexible reinforcing structure.

4. An expansion joint comprising a peripherally corrugated tube, and independent rings having central portions bearing on the interior of the tube between the corrugations thereof, and laterally projecting edge portions adapted to meet within the tube to limit the contraction of the latter, said rings being composed of segments adapted to be assembled within the tube and provided with means for detachably connecting their meeting ends.

5. An expansion joint comprising a peripherally corrugated tube, and independent rings having central portions bearing on the interior of the tube between the corrugations thereof, and laterally projecting edge portions adapted to meet within the tube to limit the contraction of the latter, each ring being composed of elongated segments having coupling members at their meeting ends, and a shorter segment forming a key piece having means for positive detachable connection with the ends of adjacent elongated segments.

6. An expansion joint comprising a peripherally corrugated tube, and independent rings having central portions bearing on the interior of the tube between curves formed by the corrugations thereof, and laterally projecting edge portions adapted to meet within the tube to limit the contraction of the latter, each ring being composed of elongated segments having dowels and sockets at their meeting ends, and a shorter segment forming a key piece having ears at its ends adapted to be attached to the adjacent elongated segments, the latter being recessed to receive said ears.

7. An expansion joint comprising a flexible tube peripherally corrugated to permit longitudinal expansion and contraction, and a skeleton reinforcing structure movable with the tube and having opposed, normally separated edges surrounding the passage through the tube and adapted to be abutted together by the contraction of the tube, and to be separated by the elongation of the tube, the said structure being adapted to bear upon the tube between the corrugations thereof, said structure being composed of segments adapted to be assembled end to end, and provided with means for detachably connecting their meeting ends.

8. An expansion joint comprising a continuous flexible tube peripherally corrugated to permit longitudinal expansion and contraction, and a flexible skeleton reinforcing structure within the tube having opposed normally separated edges surrounding the passage through the tube and adapted to be abutted together by the contraction of the tube, and to be separated by the elongation of the tube, the said structure being formed to bear on the interior of the tube between the corrugations thereof.

9. An expansion joint comprising a flexible tube peripherally corrugated to permit longitudinal expansion and contraction, and a skeleton reinforcing structure within the tube having opposed normally separated edges surrounding the passage through the tube and adapted to be abutted together by the contraction of the tube, and to be separated by the elongation of the tube, the said structure being formed to bear on the interior of the tube between the corrugations thereof and being composed of segments adapted to be assembled within the tube and provided with means for detachably connecting their meeting ends.

In testimony whereof I have affixed my signature, in presence of two witnesses.

ARTHUR C. BADGER.

Witnesses:
C. F. BROWN,
P. W. PEZZETTI.